(12) United States Patent  
Rosenoff et al.

(10) Patent No.: US 8,909,616 B2  
(45) Date of Patent: Dec. 9, 2014

(54) INFORMATION-RETRIEVAL SYSTEMS, METHODS, AND SOFTWARE WITH CONTENT RELEVANCY ENHANCEMENTS

(75) Inventors: Douglas T. Rosenoff, Issaquah, WA (US); Christopher Crowhurst, Whitehall, MD (US)

(73) Assignee: Thomson Reuters Global Resources, Baar (CH)

( * ) Notice: Subject to any disclaimer, the term of this patent is extended or adjusted under 35 U.S.C. 154(b) by 1723 days.

(21) Appl. No.: 11/855,751

(22) Filed: Sep. 14, 2007

(65) Prior Publication Data

US 2008/0071772 A1     Mar. 20, 2008

Related U.S. Application Data

(60) Provisional application No. 60/844,534, filed on Sep. 14, 2006.

(51) Int. Cl.
G06F 17/30     (2006.01)

(52) U.S. Cl.
CPC .................. *G06F 17/30864* (2013.01)
USPC .............. 707/708; 707/731; 709/203

(58) Field of Classification Search
CPC ............ G06F 17/30672; G06F 17/30873; Y10S 707/99933
USPC ................. 707/3, 713, 708, 731
See application file for complete search history.

(56) References Cited

U.S. PATENT DOCUMENTS

| | | |
|---|---|---|
| 4,974,191 A | 11/1990 | Amirghodsi et al. |
| 5,224,205 A | 6/1993 | Dinkin et al. |
| 5,511,208 A | 4/1996 | Boyles et al. |
| 5,659,731 A | 8/1997 | Gustafson |
| 5,715,395 A | 2/1998 | Brabson et al. |
| 5,748,945 A | 5/1998 | Ng |
| 5,751,956 A | 5/1998 | Kirsch |
| 5,764,906 A | 6/1998 | Edelstein et al. |

(Continued)

FOREIGN PATENT DOCUMENTS

| | | |
|---|---|---|
| WO | WO-9919816 A1 | 4/1999 |
| WO | WO-9939275 A1 | 8/1999 |

(Continued)

OTHER PUBLICATIONS

Why and Where: A Characterization of Data Provenance, University of Pennsylvania, Department of Computer and Information Science; Lecture Notes in Computer Science vol. 1973, 2001, pp. 316-330).*

(Continued)

*Primary Examiner* — Cheryl Lewis
(74) *Attorney, Agent, or Firm* — Hoffmann & Baron, LLP

(57) ABSTRACT

The present inventors devised, among other things, systems, methods, and software for enhancing the relevancy of content presented to users in response to queries in an online information retrieval system. One exemplary system refines a user input query by making suggestions of alternatives queries, classifying the query using language processing, or selecting one or more databases or search engines as targets for the refined query. A switchboard module converts the refined query, administers one or more searches, and collects search results from one or more search engines based on the refined query. And, a post-processor module refines the collected search results by, for example, modifying the order of the results, removing inappropriate or undesirable content from the results, and/or applying historical performance analysis.

28 Claims, 4 Drawing Sheets

(56) References Cited

U.S. PATENT DOCUMENTS

| | | |
|---|---|---|
| 5,794,050 A | 8/1998 | Dahlgren et al. |
| 5,835,897 A | 11/1998 | Dang |
| 5,855,020 A | 12/1998 | Kirsch |
| 5,929,852 A | 7/1999 | Fisher et al. |
| 5,974,444 A | 10/1999 | Konrad |
| 5,978,847 A | 11/1999 | Kisor et al. |
| 6,006,222 A | 12/1999 | Culliss |
| 6,014,665 A | 1/2000 | Culliss |
| 6,029,192 A | 2/2000 | Hill et al. |
| 6,041,311 A | 3/2000 | Chislenko et al. |
| 6,067,539 A | 5/2000 | Cohen |
| 6,092,100 A | 7/2000 | Berstis et al. |
| 6,112,242 A | 8/2000 | Jois et al. |
| 6,138,155 A | 10/2000 | Davis et al. |
| 6,151,624 A | 11/2000 | Teare et al. |
| 6,192,364 B1 | 2/2001 | Baclawski |
| 6,269,361 B1 | 7/2001 | Davis et al. |
| 6,271,840 B1 | 8/2001 | Finseth et al. |
| 6,366,956 B1 | 4/2002 | Krishnan |
| 6,460,036 B1 | 10/2002 | Herz |
| 6,480,837 B1 | 11/2002 | Dutta |
| 6,546,388 B1 | 4/2003 | Edlund et al. |
| 6,615,237 B1 | 9/2003 | Kyne et al. |
| 6,772,149 B1 * | 8/2004 | Morelock et al. ............ 1/1 |
| 6,873,982 B1 | 3/2005 | Bate et al. |
| 6,938,001 B2 * | 8/2005 | Kimmel, Jr. ............ 705/26.1 |
| 7,096,214 B1 | 8/2006 | Bharat et al. |
| 7,765,199 B2 * | 7/2010 | Dunie et al. ............ 707/711 |
| 8,250,050 B2 * | 8/2012 | Miller et al. ............ 707/705 |
| 2001/0047355 A1 * | 11/2001 | Anwar ............ 707/5 |
| 2001/0049677 A1 * | 12/2001 | Talib et al. ............ 707/3 |
| 2002/0149614 A1 * | 10/2002 | Biebesheimer et al. ...... 345/738 |
| 2005/0149496 A1 * | 7/2005 | Mukherjee et al. ............ 707/3 |
| 2008/0071772 A1 | 3/2008 | Rosenoff et al. |

FOREIGN PATENT DOCUMENTS

| | | |
|---|---|---|
| WO | WO-9939280 A2 | 8/1999 |
| WO | WO-2006023542 A2 | 3/2006 |
| WO | WO-2008033511 A2 | 3/2008 |
| WO | WO-2008033511 A3 | 3/2008 |

OTHER PUBLICATIONS

"International Application Serial No. PCT/US2007/020017, International Search Report mailed Apr. 21, 2008", 5 pgs.

"International Application Serial No. PCT/US2007/020017, Written Opinion mailed Apr. 21, 2008", 6 pgs.

* cited by examiner

INFORMATION-RETRIEVAL SYSTEMS, METHODS, AND SOFTWARE WITH CONTENT RELEVANCY ENHANCEMENTS

CROSS-REFERENCE TO RELATED APPLICATION

This application claims priority to U.S. provisional application 60/844,534, which was filed on Sep. 14, 2006 and which is incorporated herein by reference.

COPYRIGHT NOTICE AN PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2006, Thomson Global Resources, an entity organized under the laws of Ireland.

TECHNICAL FIELD

Various embodiments of the present invention concern information-retrieval systems and related query processing components and methods.

BACKGROUND

The growth in popularity of the Internet and other computer networks has fueled not only an increasing availability, but an increasing appetite among computer users for digital information. Users typically seek access to this information using an access device, such a computer, to communicate with an online information-retrieval system. The information-retrieval system typically includes a graphical user interface for entering and submitting requests for information, known as queries, to a remote search engine. The search engine identifies relevant information, typically in the form of documents, and returns a results list to the user's access device.

One problem that the present inventors recognized in conventional information-retrieval systems concerns users entering poorly defined queries and receiving search results that include hundreds or maybe even thousands of documents. Even though the documents are often ranked in terms of quantitative relevance to the query, the task of identifying the documents most pertinent to the user's objective is onerous and time consuming. Moreover, if the query is poorly defined, the ultimate ranking of results is unlikely to be useful.

Accordingly, the inventors have identified a need to further improve how information-retrieval systems process user queries.

SUMMARY

To address this and/or other needs, the present inventors devised, among other things, systems, methods, and software for enhancing the relevancy of content presented to users in response to queries in an online information retrieval system. One exemplary system includes a database and a server for receiving and answering queries for content in the database. The server further includes a preprocessing module, a switchboard module, and a post-processing module. The preprocessing module refines a user input query by making suggestions of alternatives queries, classifying the query using language processing, or selecting one or more portions of the legal-research database or search engines as a target for the refined query. The switchboard module converts the refined query and associated information developed by the pre-processor module, administers one or more searches, and collects search results based on the refined query. The post-processor module receives search results based on the refined input query and refines the search results. Exemplary modifications include modifying the order of the search results, removing inappropriate or undesirable content from the results, and/or applying historical performance analysis to improve the relevance of the information presented to the user.

DETAILED DESCRIPTION OF EXEMPLARY EMBODIMENT(S)

This document describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
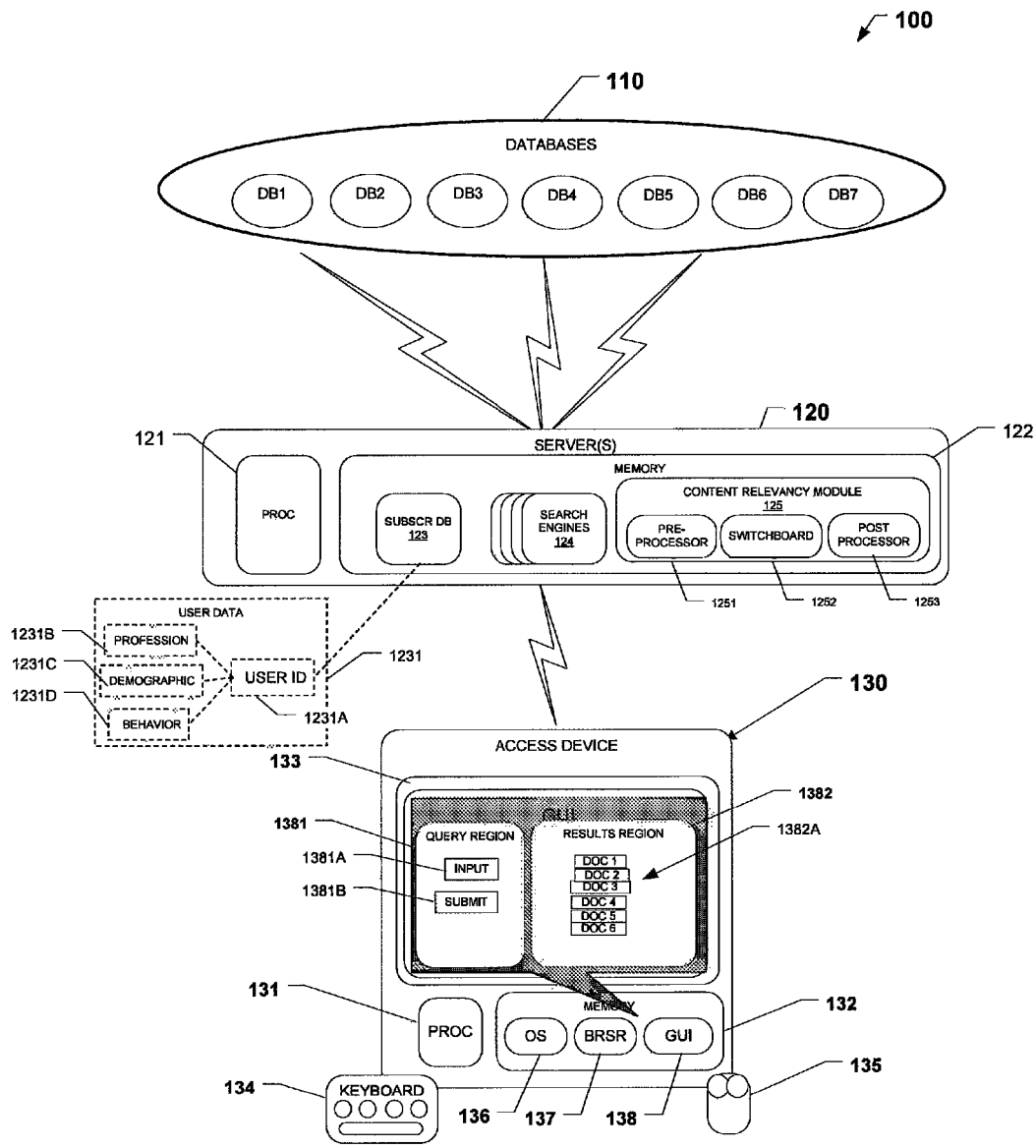
FIG. 1 is a block diagram of an exemplary information-retrieval system 100 which corresponds to one or more embodiments of the present disclosure.

FIG. 1 shows an exemplary online information-retrieval system 100. System 100 includes one or more databases 110, one or more servers 120, and one or more access devices 130.

Exemplary Databases

Databases 110 includes a set of one or more databases. Exemplary legal databases include a caselaw database and a statutes database, which respectively include judicial opinions and statutes from one or more local, state, federal, and/or international jurisdictions. Exemplary legal databases also include legal classification databases and law reviews. Other exemplary databases provide attorney, judge, law firm, product, and corporate profiles. In some embodiments, the caselaw documents are logically associated via a data structure with documents or profiles in other databases. Other embodiments may include non-legal databases that include financial, scientific, or health-care information. Still other embodiments provide public or private databases, such as those made available through INFOTRAC. Some embodiments also include web sites and web pages.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Exemplary Server

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, search modules or engines 124, and a content-relevancy module 125.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, search module 124, and content relevancy module 125.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1231 includes a customer or user identifier portion 1231A, which is logically associated with one or more user data fields or preferences, such as fields or preferences 1231B, 1231C, and 1231D. Field 1231B includes data regarding the profession of the user. Field 1231C includes demographic data regarding the user. Field 1231D includes data regarding online behavior of the user. (In the absence of a temporary user override, for example, an override during a particular query or session, the default value for the user preference governs.)

Search module 124 includes one or more search engines and related user-interface components, for processing queries against one or more of databases 110. In some embodiments, one or more search engines associated with search module 124 provide Boolean, tf-idf, natural-language search capabilities, or search engines specialized for searching multimedia or types of content. In the exemplary embodiment, search engines are regarded as third-party, commodity black-box components or environments that are selected according to the desires (explicit or derived) of the user and/or requesting application. In the above figure, the search engines are coupled directly or operatively to one or more corresponding databases (not shown). In some embodiments, two or more of the search engines are coupled to the same database; whereas in other embodiments, the search engines are each coupled to separate and independent databases. In some instances, the databases are under control or ownership of third-parties.

Content-relevancy module 125 includes machine readable and/or executable instruction sets for enhancing the relevancy of content provided to users in response to their queries. To this end, content-relevancy module 125 includes a pre-processor module 1251, a switchboard module 1252, and a post-processor module 1253.

In general, the function of pre-processor module 1251 is to process a user input query, refine it, make suggestions of alternatives, classify the query using language processing, and select the appropriate content sources or search engines. Switchboard module 1252 converts the refined query and associated information developed by pre-processor module 1251 to administer one or more searches, and collect the search results. Post-processor module 1253 refines the search results, modifying the order of results, removing inappropriate or undesirable content, and/or applying historical performance analysis to improve the relevance of the information ultimately presented to a user of an access device, such as access device 130. (More detailed description of the function and features of the modules within content-relevance module 125 is provided below.)

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). The exemplary embodiment defines one or more portions of GUI 138 using applets or other programmatic objects or structures from server 120 to implement the interfaces shown above or described elsewhere in this description.

In the exemplary embodiment, each of these control features takes the form of a hyperlink or other browser-compatible command input, and provides access to and control of a query region 1381 and a search-results region 1382. User selection of the control features in region 1382, specifically input of a textual query into input field 1381A and submission of the query to server 120 via actuation of submit button 1381B, results in presentation of search results list 1382A in results region 1382. Selection of a listed document from list 1382A results in retrieval of and display of at least a portion of the corresponding document within a region of GUI 138 (not shown in this figure.) Although FIG. 1 shows region 1381 and 1382 as being simultaneously displayed, some embodiments present them at separate times.

Exemplary Method(s) of Operation

Figure 2:
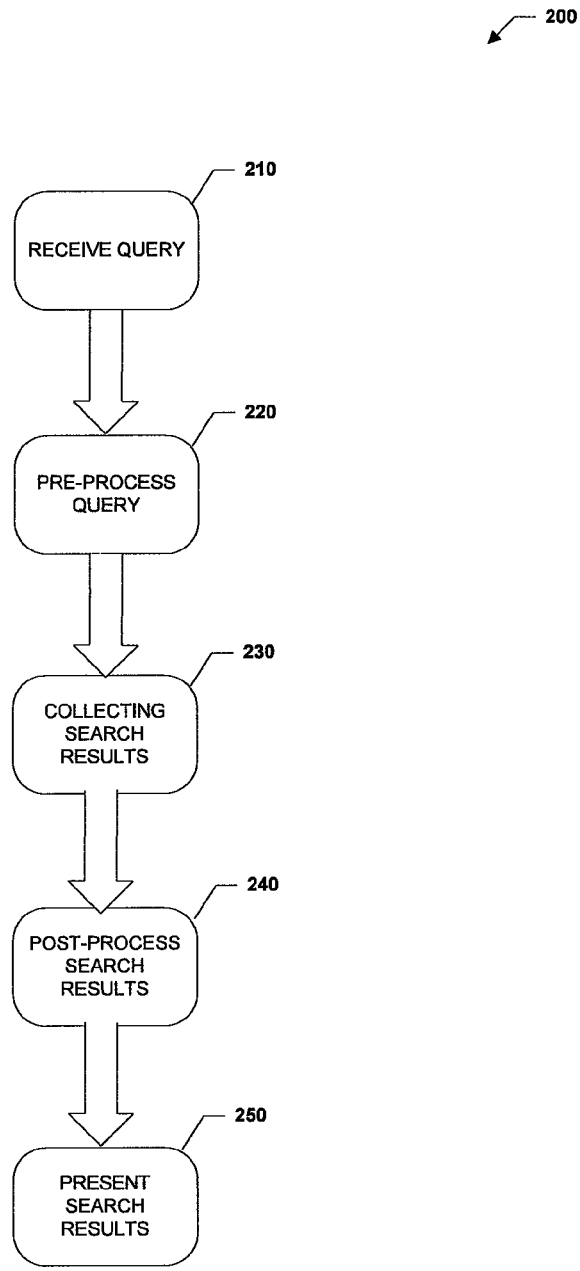
FIG. 2 is a flow chart of an exemplary method of operating system 100, which corresponds to one or more embodiments of the present invention.

FIG. 2 shows a flow chart 200 of one or more exemplary methods of operating a system, such as system 100. Flow chart 200 includes blocks 210-250, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

In block 210 the method begins with receiving a query from a user. In the exemplary embodiment, this entails a user using a browser capability in access device 130 to access online information-retrieval system 100, specifically server 120 using a conventional login process. Once logged in, a user interface, such as GUI 138 is rendered, enabling the user to define and submit a query to server 120. Execution proceeds to block 220.

Block 220 entails pre-processing the received query along with related user information. In the exemplary embodiment, pre-processing of the query occurs within pre-processor module 1251 of content-relevancy module 125 in server 120. However, in some embodiments, pre-processor module 1251 may be located in whole or in part within access device 130 or within a separate server. Pre-processing entails parsing the query and related information to separate out specific query term syntactic elements for additional processing. This additional processing can include one or more of the following:

Selecting of one or more ontologies or taxonomies based on the provenance of the requesting client application (q.v. selection of the KeySearch for general predefined queries from an online legal research system such as Westlaw, selection of West Legal Directory for queries coded with a field of attorney or judge, or selection of West Medical Taxonomy for queries coming from a malpractice tab of an online research system).

Expanding and/or refining the query to include appropriate broader content topics or concepts as well as more specific topics or query terms. For example, assume a query of the single term "maple". Via the syntactic relationships derived from the taxonomies and other data structures, additional query terms such as "Acer", "Maple Sugar", "Maple Leaf", "Hockey", "Maple Leaf Hockey Team", and "Toronto Sports Teams" might be added depending on the taxonomy(s) selected in a previous step.

Expanding and refining the query to change or select various content sources or search engines by associating the query terms with information found in the taxonomies or ontologies. For example, a query including the term SBX might automatically assign the query to a search engine with better financial coverage or to a SEC filing content source rather than a general purpose search engine. In some embodiments, pre-processor module 1251 uses the information in the query and, optionally, additional information (for example, user or workflow context information) passed by the requesting client application, to refine the query. Exemplary refinement includes tailoring the query to the profession, demography, behavior, and/or other defining characteristic of the original user (as indicated in the context information or as may be associated with user access credentials for the information-retrieval system). Pre-processor module 1251 also selects one or more appropriate search engines based on an analysis of the information held in the refined query and its related data.

Correcting the query terms for spelling, case, and syntax, depending on both dictionary lookup information and the taxonomy or other semantic lookup method used (q.v. "Aser Palmatum" is corrected to "Acer palmatum" if a taxonomy associated with tree pathology is selected in a prior step or converted to the single query term "Ace" if an ontology associated with gaming is selected).

To support these activities, pre-processor module 1251 includes a variety of taxonomies, ontologies, folksonomies, synonym lists, reserved or restricted term lists, stop word lists, classification algorithms, and semantic tools for processing received queries. Data structures for the taxonomies, ontologies, and so forth may be editorially or programmatically populated and may consist of proprietary and/or public domain data. These structures may be shared among all clients accessing pre-processor module 1251 or restricted to specific requesting applications or clients. These structures may be fixed in that they are not subject to feedback from other components, or they may be adaptive in that the contribution they provide for an algorithmic choice may change based on user feedback or input. Each of the various data structures have one or more algorithms for associating specific query terms or semantic elements to the entries in the various data structures. Such relationships may be combined to produce stronger or weaker recommendations for any of the methods of refining the query mentioned above.

Pre-processor module 1251 also includes functionality for sending clarification and feedback messages back to the user prior to executing the query. Such messages for relevance clarification allow the user to refine their query before incurring the expense of actually running one or more searches. For example, in response to a query including the term Salvia, the pre-processor module 1251 can request the user for clarification of whether he is interested in "Hallucinogenic Substances" (based on a related concept entry for "Salvia Divinorum" in a legal taxonomy). Such clarification messaging are made to the requesting application with the notion that the resulting clarifications (if any) serve as grist for recursive processing of the query before passing it and any related data over to the switchboard module 1252 component for forwarding to appropriate search engines.

Pre-processor module 1251 keeps a record of selected operations performed on the input query and the refined query as well as a record of taxonomies, content sources, and/or search engines selected, passing the information to the switchboard module 1252. Pre-processor module 1251 also provides a mechanism for updating adaptive taxonomies and similar semantic relationship data structures by receiving feedback from the post-processor module 1253. Such feedback may be used to dynamically alter the weights of any given factor used to select related terms, refine concepts or queries, or select content sets or search engines. After pre-processing of the query, execution continues at block 230.

Block 230 entails collecting search results based on the refined or preprocessed query. In the exemplary embodiment, this entails the pre-processor module 1251 forwarding the refined or pre-processed query and related information to switchboard module 1252. In turn, switchboard module 1252 forwards the refined query to one or more search engines identified by preprocessor module 1251. In the exemplary embodiment the switchboard module 1252 and the pre-processor module 1251 are implemented using the same server; however, in other embodiments they may be distributed.

More specifically, the exemplary switchboard module 1252 performs several functions with the preprocessed query and related information as input:

Converting the refined query and related data to the syntax required for one or more search engines;

Submitting the syntactically correct refined query to one or more search engines;

Caching the query and related data, including search engine selection analysis and parameterization;

Waiting for query results to return from one or more search engines according to a set of defined parameters;

Gathering the search results from one or more search engines;

Organizing and/or federating the results from one or more search engines;

Passing the search engine results and the related data to post-processor module 1253.

Switchboard module 1252 also provides a feedback channel for taking information from the post-processor and returning it to pre-processor module 1251. Such feedback data is used to continually refine and enhance the functionality of pre-processor module 1251 by tuning the taxonomies, ontologies, classification schemes, and semantic analysis techniques used in refinement of later queries. Execution continues at block 240.

Block 240 entails post-processing of the search results. To this end, in the exemplary embodiment, post-processor 1253 takes as input one or more search results, as well as the refined query and its related information. It then performs a variety of taxonomic, semantic, syntactic, classification, and combinatorial operations on the search result(s), eventually creating a new, highly refined result. The refined result, possessing significantly more targeted, relevant results for the user, is then passed back to the requesting client application which then passes it back to the user.

To accomplish this, the post-processor module 1253 may perform a number of operations including:

Federating the results from one or more search engines using a variety of algorithmic and/or user interaction methods;

Formatting the results according to a generic template or one provided by the requesting application;

Collecting and holding feedback information provided by the requesting application;

Refining its own taxonomic, semantic, syntactic, classification and combinatorial operations based on the feedback;

Returning the feedback information to the pre-processor module via the switchboard module for eventual refinement of pre-processing operations;

Logging the execution of the query, the refinements made to the results, and the result itself;

Monitoring and recording the reception and disposition of feedback from the requesting application.

To facilitate reordering and/or redacting, or more generally refining the collected search results, post-processor module 1253 also includes a series of data structures. These data structures, which are stored in a memory or otherwise associated with the post-processor module 1253, may include various white lists (websites of known high relevance), black lists (sites to be redacted from result lists), as well as data structures and methods for relating specific terms or topics to particular domains, sub-domains, pages, and/or content types. Such relationships between topics and sites on the Internet (characterized by a Uniform Resource Name) may be created editorially, programmatically by deriving them from one or more ontologies or taxonomies, and/or adaptively from data provided by user interaction.

Figure 3:
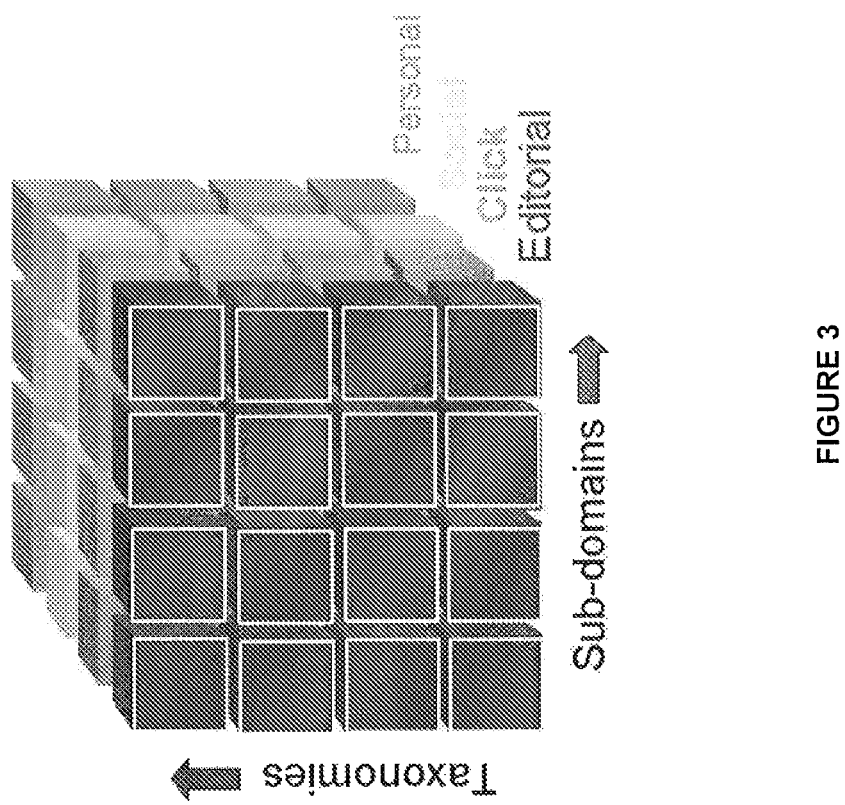
FIG. 3 is a conceptual diagram of a three-dimensional relevance data structure 300 that is used within system 100 and which corresponds to one or more embodiments of the present invention.

FIG. 3 shows one exemplary implementation of a three-dimensional data structure, referred to herein as a relevance cube 300. Cube 300 is divided into cells with the x-value of any specific cell in the cube providing a list of URL locations, and the y-axis consisting of one or more concepts or terms associated with the relevance and the content of the cube include some weight value.

A field of cells may be defined by deriving the terms from a taxonomy to provide the list of terms along the y-axis of the stack and a list of "white" (highly relevant) sites along the x-axis. Several fields of cells may be combined to form a preference cube, associated with a specific user, for example in a user data structure stored in subscriber database 123. When the post-processor module 1253 analyzes a raw result set returned from a search engine, an algorithm breaks it down into individual search results associated with a particular result location to which it points, a title, relevance value, and perhaps a snippet of surrounding text.

One embodiment provides another algorithm to scan the individual search results for the location to which it points. If one of the locations is found, the query terms, the page title, and/or any terms in the individual result snippet set are compared with the topic terms to produce one or more derived terms. If an intersection for the location along the x-axis and the derived terms along the y-axis exists, the weight in the corresponding cell is looked up and then multiplied with a conventional relevance score for the particular result. The newly weighted scores can then be used to bubble the individual search result higher or lower to produce the new refined search result.

Fields may be combined to produce cubes. By traversing along the z-axis through the cube while holding the x- and y-values constant, a combined weight can be derived for a particular topic/location combination. Such a combined weight can be used to reflect numerous additional criteria at the same time.

In the example of FIG. 3, four fields of cells are shown: editorial, click-through, social, and user. The editorial field is created editorially by deriving the topics from a fixed taxonomy and combining those with selected locations on the World Wide Web. Its weighting values are static in the sense that the weighting values are not subject to change by user feedback. However the entire field may grow or shrink when additional topics are added to the topology or additional locations are added.

The click-through field is a derived field. It initially consists of no weights but is populated when an individual user clicks through from a search result into a particular document page. Such a click-through evidences some decision by a particular user that this page has a higher value than others in a particular search result and hence deserves a higher weighting when subsequent search results are created by other users. The click through is fed back from the access device to the server and ultimately to the post-processor module. The net effect of this activity is to raise or lower the weight of a particular cell in this field.

The social field is a derived field. Like the click-through field it is initially blank but populated when users specifically give feedback that the result set is particularly relevant to the terms in the refined query. In such cases, the weights in multiple topic/location cells are raised or lowered to express the user preference.

The user field is a derived field. Like other derived fields it is initially blank but can be populated by the user activity in a variety of ways. For example a particular customer firm or user may block out lists or sites so that they are not included in refined results at all (q.v. black list the sites), raise the value of certain sites as highly relevant to them (q.v. white list the site), and block out or enhance the weights of various topic terms. In such cases the resulting field may be made highly specific to a particular customer, company, or even requesting application.

Note that there is no limiting factor on the number of criteria that may be expressed as a particular field. A relevance field may consist of an arbitrary number of topics and locations. Similarly a relevance cube may consist of N arbitrary fields. Note also that different requesting applications may share one or more relevance cubes. Similarly a particular application may restrict itself to one or more selected cubes, some of which may be proprietary to it alone.

After post-processing of the search results in block 240 to produce a refined set of search results, execution continues at block 250. Block 250 entails presenting the refined search results to the user via a graphical user interface such as GUI 138 of access device 130 in FIG. 1. As noted above, user interaction with the search results is ultimately fed back to the post-processor to enable refinement of relevance weights.

Exemplary Data Flow

Figure 4:
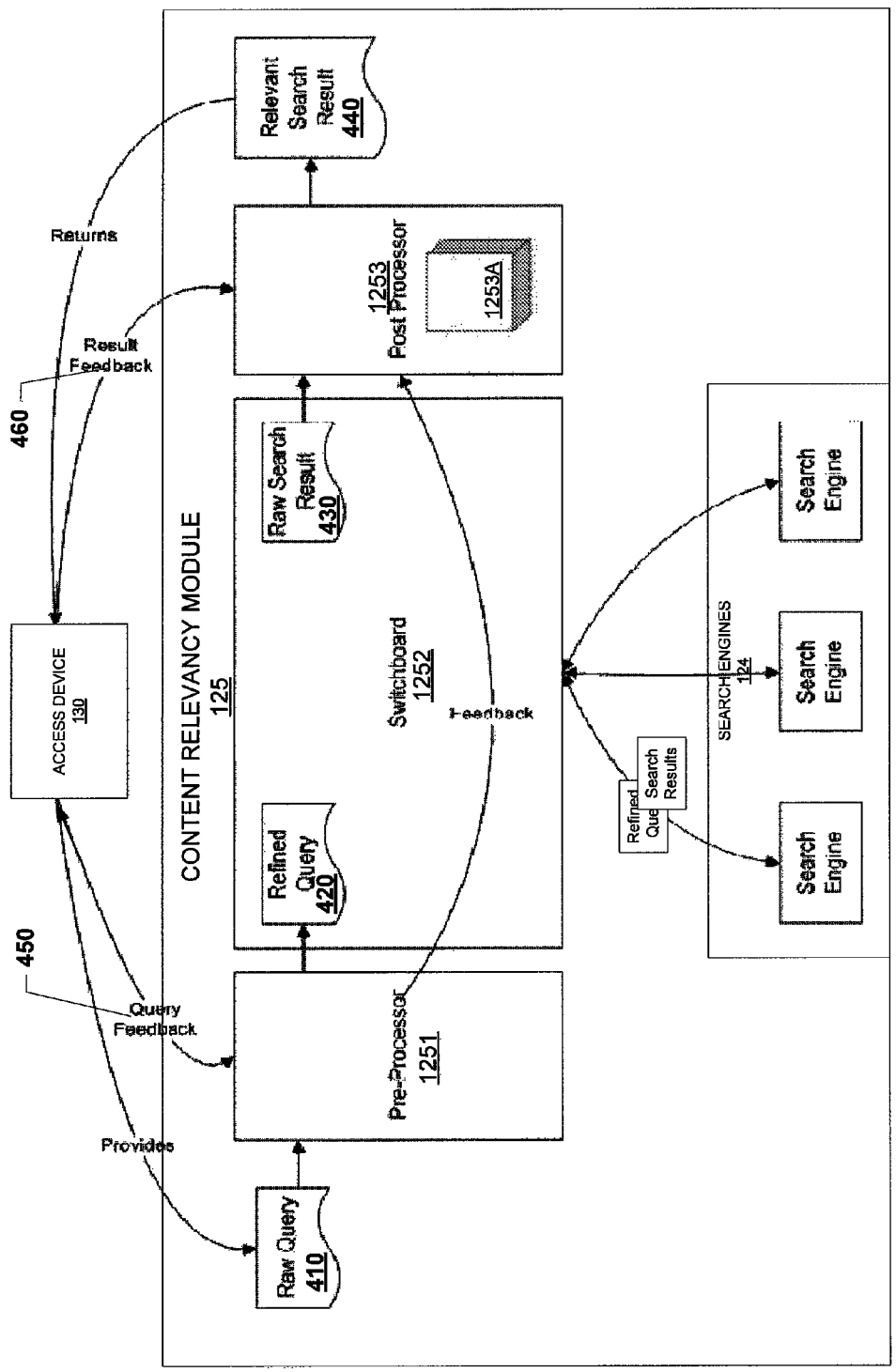
FIG. 4 is an alternative block diagram of various components of system 100, which highlights various data flows and which corresponds to one or more embodiments of the invention.

FIG. 4 shows an alternative block diagram of a portion of system 100, highlighting various data flows between components of content-relevancy module 125, search engines 124, and access device 130. Notably, FIG. 4 shows flow of a raw query 410 from access device 130 to pre-processor module 1251, and a refined query 420 from pre-processor module 1251 to switchboard module 1252. Switchboard module 1252 communicates the refined query and receives search results from search engines 124, aggregating and passing the received results in the form of raw search results 430 to post-processor module 1253. After post-processing, post-processor module 1253 communicates the results as relevant search results 440 to access device 130. Additional data flows, in the exemplary system, include query feedback data 450 from access device 130 to pre-process module 1251 through switchboard module 1252 to post-processor module 1253. Result feedback data 460 flows from access device 130 to post-processor module 1253, facilitating adjustment of weights within relevance cubes 1253A.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. An information retrieval system, the system comprising: at least one database storing a plurality of documents; and a server coupled to the at least one database, the server comprising:
    a processor; and
    a memory storing instructions that, when executed by the processor, cause the processor to perform operations comprising:
        receiving a query, the query including a first term, from a requesting application presented by a client access device, the requesting application having a plurality of subject areas, the query associated with a subject area of the plurality of subject areas;
        selecting a taxonomy that is associated with the subject area of the query, the plurality of subject areas being related to different taxonomies;
        refining the query based on the taxonomy selected to include a second term in the query; and
        processing the query as refined against the at least one database to return a search result including at least one document to the client device.

2. The system of claim 1, wherein the at least one database includes one or more of: legal database, law-related database, financial database, scientific database, health-care database, corporate database, product database, website database, webpage database, public or private database, and combinations thereof.

3. The system of claim 1, wherein the different taxonomies includes a legal taxonomy.

4. The system of claim 1, wherein the operations further include refining the search result in accordance with a multi-dimensional data structure that relates topics in a taxonomy of the different taxonomies to documents and associated relevance weighting factors.

5. The system of claim 4, wherein the operations further comprise reordering the at least one document in the search result based on the relevance weighting factors of the multi-dimensional data structure.

6. The system of claim 1, wherein operations further comprise refining the query by including a broader topic based on the taxonomy selected.

7. The system of claim 1, wherein the operations further comprise refining the query by including a selection of a particular database or a particular search engine based on the taxonomy selected.

8. The system of claim 7, wherein the operations further comprise making the selection algorithmically based on the taxonomy selected and user input from the client access device.

9. The system of claim 1, wherein the operations further comprise refining the query by correcting at least one of spelling, case and syntax of the first term in the query based on the taxonomy selected.

10. The system of claim 1, wherein the operations further comprise refining the search result in accordance with a black list of documents, the black list indicating one or more documents to be redacted from the search result.

11. The system of claim 1, wherein the operations further comprise refining the search result in accordance with a white list of documents, the white list indicating one or more documents to be added to or elevated in the search result.

12. A method of retrieving documents, the method comprising:
    receiving by a server a query, the query including a first term, from a requesting application presented by a client access device, the requesting application having a plurality of subject areas, the query associated with a subject area of the plurality of subject areas;
    selecting a taxonomy that is associated with the subject area of the query, the plurality of subject areas being related to different taxonomies;
    refining the query based on the taxonomy selected to include a second term in the query;
    processing the query as refined against at least one database storing documents to retrieve a search result including at least one document; and
    transmitting the search result to the client access device.

13. The method of claim 12, wherein refining the query includes selecting a particular database or a particular search engine based on the taxonomy selected.

14. The method of claim 13, wherein the selection is made algorithmically based on the taxonomy selected and user input from the client access device.

15. The method of claim 12, further comprising refining the search result before transmission to the client access device in accordance with a black list of documents, the black list indicating one or more documents to be redacted from the search result.

16. The method of claim 12, further comprising refining the search result before transmission to the client access device in accordance with a white list of documents, the white list indicating one or more documents to be added to or elevated in the search result.

17. The method of claim 12, further comprising refining the search result before transmission to the client access device in accordance with a multi-dimensional data structure that relates topics in the taxonomy selected to documents and associated relevance weighting factors.

18. The method of claim 17, wherein refining the search result includes reordering the at least one document in the search result based on the relevance weighting factors of the multi-dimensional data structure.

19. The method of claim 12, wherein refining the query includes correcting at least one of spelling, case and syntax of the first term in the query based on the taxonomy selected.

20. A server of an information retrieval system, the server comprising:
  at least one processor; and
  a memory storing instructions that, when executed by the processor, cause the at least one processor to perform operations, the at least one processor comprising:
  a preprocessor, wherein operations associated with the preprocessor include:
  receiving a query by the server from a requesting application presented by a client access device, the query including a first term, the requesting application having a plurality of subject areas, the query associated with a subject area of the plurality of subject areas;
  selecting a taxonomy that is associated with the subject area of the query, the plurality of subject areas being related to different taxonomies; and
  refining the query based on the taxonomy selected to include a second term in the query;
  a switchboard, wherein operations associated with the switchboard include retrieving a search result from at least one database in accordance with the query as refined, the search result including at least one document; and
  a postprocessor, wherein operations associated with the postprocessor include refining the retrieved search result for transmission by the server to the client access device.

21. The server of claim 20, wherein operations associated with the preprocessor include refining the query by including a broader topic based on the taxonomy selected.

22. The server of claim 20, wherein operations associated with the preprocessor include refining the query by including a selection of a particular database or a particular search engine based on the taxonomy selected.

23. The server of claim 22, wherein operations associated with the preprocessor include making the selection algorithmically based on the taxonomy selected and user input from the client access device.

24. The server of claim 20, wherein operations associated with the preprocessor include refining the query by correcting at least one of spelling, case and syntax of the first term in the query based on the taxonomy selected.

25. The server of claim 20, wherein operations associated with the postprocessor include refining the search result in accordance with a multi-dimensional data structure that relates topics in the taxonomy selected to documents and associated relevance weighting factors.

26. The system of claim 25, wherein operations associated with the postprocessor include reordering the at least one document in the search result based on the relevance weighting factors of the multidimensional data structure.

27. The server of claim 20, wherein operations associated with the postprocessor include refining the search result in accordance with a black list of documents, the black list indicating one or more documents to be redacted from the search result.

28. The server of claim 20, wherein operations associated with the postprocessor include refining the search result in accordance with a white list of documents, the white list indicating one or more documents to be added to or elevated in the search result.

* * * * *